United States Patent
Biderman et al.

(10) Patent No.: US 7,104,184 B2
(45) Date of Patent: Sep. 12, 2006

(54) FEEDING FORMULA APPLIANCE (75) Inventors: Eytan Biderman, 5 Barazani St., 62121 Tel Aviv (IL); Noam Ziv, Tel Aviv (IL)

(73) Assignee: Eytan Biderman, Tel-Aviv (IL)

( * ) Notice: Subject to any disclaimer, the term of this patent is extended or adjusted under 35 U.S.C. 154(b) by 108 days.

(21) Appl. No.: 10/755,289

(22) Filed: Jan. 13, 2004

(65) Prior Publication Data

US 2005/0150393 A1 Jul. 14, 2005

(51) Int. Cl.
*A47J 31/00* (2006.01)

(52) U.S. Cl. .............................. 99/282; 99/299; 99/290; 99/283

(58) Field of Classification Search ................. 99/282, 99/281, 283, 280, 299, 300, 305, 289 R, 99/290

See application file for complete search history.

(56) References Cited

U.S. PATENT DOCUMENTS

| | | | |
|---|---|---|---|
| 3,100,434 A * | 8/1963 | Bunn | 99/282 |
| 3,218,175 A | 11/1965 | Siegel et al. | |
| 3,352,460 A | 11/1967 | Herring | |
| 4,651,862 A | 3/1987 | Greenfield | |
| 4,753,370 A | 6/1988 | Rudick | |
| 4,993,593 A | 2/1991 | Fabiano | |
| 5,570,816 A | 11/1996 | LaBarbera, Jr. | |
| 5,797,313 A | 8/1998 | Rothley | |
| 5,808,276 A | 9/1998 | Padilla | |
| 5,858,437 A * | 1/1999 | Anson | 426/431 |
| 5,975,365 A * | 11/1999 | Hsieh | 222/129.4 |
| 6,118,933 A | 9/2000 | Roberson | |
| 6,148,717 A | 11/2000 | Lassota | |
| 6,173,117 B1 * | 1/2001 | Clubb | 392/442 |
| 6,240,829 B1 * | 6/2001 | McGarrah | 99/275 |
| 6,253,028 B1 | 6/2001 | Roberson | |

FOREIGN PATENT DOCUMENTS

| | | |
|---|---|---|
| CH | 456885 | 5/1968 |
| GB | 2019813 | 7/1979 |
| WO | WO 97/47224 | 12/1997 |

* cited by examiner

*Primary Examiner*—Reginald L. Alexander (57) ABSTRACT

A device for preparing a fluid food at a desired consumption temperature on demand, comprising two reservoirs of water, a container containing a formula, a data processor and a controller for dispensing water of the correct temperature from each of the reservoirs and the formula from the container into a vessel. Also provided is a method to prepare a fluid food at a desired consumption temperature on demand.

23 Claims, 7 Drawing Sheets

FEEDING FORMULA APPLIANCE

FIELD AND BACKGROUND OF THE INVENTION

The present invention relates to the field of food preparation and, more particularly, to a device and a method for the preparation of fluid food from formula at a desired consumption temperature. The present invention is useful, for example, in preparing food for infants.

The need for substitutes for mother's milk predates history with biblical and legendary references to human or canine, especially lupine, wet nurses as alternatives for mothers who were unable to nurse their babies. While wet nurses are still the alternative most approximating mother's milk, milk substitutes prepared from powdered or liquid formulas are now the preferred alternative. Most present-day baby caregivers use commercially available formulas for preparing fluid food to feed the babies in their care. The use of formula generally involves the following five steps:

1. Water is heated, generally by boiling for a few seconds, and then cooled to near a consumption temperature;
2. An appropriate amount of powdered or concentrated formula is placed in a serving vessel such as a baby bottle;
3. An appropriate amount of the cooled sterilized water is put into the serving vessel;
4. A fluid food is achieved by mixing, for example by vigorous agitation of the serving vessel; and
5. The temperature of the fluid food is tested. If the temperature is not the proper consumption temperature, steps are taken to either increase or decrease the temperature of the food as may be required.

Because infants must be fed approximately five or six times a day, it is not uncommon that this process takes place in the middle of the night. Moreover, it is commonly carried out with one hand while holding a hungry and screaming infant in the other hand. As a result there is a demand for a device that quickly and easily prepares ready to consume fluid food, especially for infants. Further, as all these steps are manual, the temperature at which the food is served is not precise. Many such devices are known in the art, all with certain limitations and none that prepare, on demand, a bottle of fluid food from formula at a desired consumption temperature.

U.S. Pat. No. 5,808,276 discloses a device that attempts to solve the stated problem, by allowing a caregiver to prepare a bottle with the desired formula in advance of its need. The device therein disclosed heats and agitates an already prepared bottle of fluid food.

U.S. Pat. No. 3,352,460 provides a device for storing and dispensing liquid formula. This device employs two compartments, one for heating water and another for cooling the water by refrigeration. The device has a number of drawbacks, including not sufficiently sterilizing the water; dispensing the fluid food at too high a temperature so that it must cool in the bottle before serving. The food is therefore not ready on demand and the baby is in risk of being burned. Overheating may reduce the nutritional value of the food. Further, not all the food may be consumed. Even further, there are no provisions for the addition of any ingredients to the food beyond water and formula.

Other attempts made to address the need for prepared fluid food for infants, include:

U.S. Pat. No. 5,397,031 which discloses a device for preparing fluid food from formula at a baby's bedside. The device does not sterilize the water used, does not provide for the addition of other ingredients, and the baby must wait for the food to reach consumption temperature.

U.S. Pat. No. 5,419,445 shows a device that provides a complex method of separating the components of fluid food for convenient mixing at a later time, preferably by agitation of the bottle in order to cause the formula to dissolve in the water. It makes no provision for preparing fluid food at a desired consumption temperature.

U.S. Pat. No. 5,570,816 shows a device which only begins heating food when activated by the user, requiring the infant to wait. In addition, the device does not boil the water long enough for it to be sufficiently sterilized and it makes no provision for the addition of other ingredients to the food.

U.S. Pat. No. 5,797,313 shows a device governed by a timer which allows a user to determine when a bottle of fluid food made from formula will be ready. This is a useful feature if it is known precisely when the infant will wake up in the middle of the night. If the infant wishes to eat at times other than the set times or to consume different amounts of food at different times, the device must be activated and the infant must wait for the food to be prepared and heated to the desired consumption temperature.

U.S. Pat. No. 6,118,933 and U.S. Pat. No. 6,253,028 disclose a device for preparing fluid food from formula which uses filtered water, rather than boiling the water for sterilization.

PCT WO97/47224 discloses a multiple bottle preparing device which heats up a bottle of fluid food to consumption temperature when activated. This device provides certain advantages for caregivers with multiple babies to feed but still requires the infant to wait for a bottle of food to be brought to the desired consumption temperature.

There exist many other devices which mix ingredients in order to prepare fluid food which are used in the food service industry, as shown in U.S. Pat. No. 3,218,175; U.S. Pat. No. 4,139,125; U.S. Pat. No. 4,651,862; U.S. Pat. No. 4,753,370; U.S. Pat. No. 4,791,860; U.S. Pat. No. 4,993,593 and British Patent GB 2 019 813 A. These devices are not compatible with infant formula.

In addition, it is known that many infants have special nutrition needs, ranging from those with preferences for different consumption temperatures to those that require medication or other additives or specific combination of ingredients and additives in their food. A device that can individualize the composition of fluid food according to specific requirements and automatically prepare and provide that food on-demand does not exist.

There is thus a widely recognized need for, and it would be highly advantageous to have, a device for the preparation of fluid food from formula that overcomes the disadvantages of prior art devices.

SUMMARY OF THE INVENTION

Herein, by formula is meant a solid or liquid concentrated composition that is mixed with a liquid, such as water, to make a fluid food. Although there exist many such formulae, for example in the field of geriatrics, health food, food supplements, sport nutrition, animal-care and veterinary medicine, the present invention will be described, for illustrative purposes, in the context of using powdered or liquid formula for feeding infants, especially human infants.

It is an object of the present invention to provide a device and a method for preparing fluid food from a formula (that is a standard formula or a personalized formula) on demand and at a desired consumption temperature.

It is preferred that a device and method of the present invention positively sterilize water by boiling for an extended period of time and that it retains the water in a substantially sterile condition.

It is preferred that a device and method of the present invention capture the steam produced by the boiling of the water and returns the vapors to the water such that the concentration of minerals and other substances in the water does not increase as a result of sterilization or heating.

It is preferred that a device and method of the present invention be configured to vary the feeding formula according to user input, both on-site and remotely.

It is preferred that a device and method of the present invention be configured so that ingredients (such as formula) do not contaminate the device.

According to one aspect of the present invention there is provided a device for preparing a fluid food having with a desired consumption temperature on demand comprising (a) at least two water reservoirs, each having an independently controllable water outlet operable on demand and a thermal sensor for detecting a temperature of water therein; (b) at least one container for holding formula (liquid or solid) having a controllable dispenser for dispending the formula on demand; (c) a data processor operably coupled with each thermal sensor, for receiving thermal records therefrom and for determining a quantity of water from each of the reservoirs needed to mix with a quantity of formula in order to achieve fluid food having a desired consumption temperature; and (d) a controller operably coupled with the data processor, each controllable outlet and the controllable dispenser for dispensing the quantity of water from each of the water reservoirs and for dispensing the quantity of formula from the container, so as to prepare the fluid food with the desired consumption temperature.

According to another aspect of the present invention there is provided a method of preparing, on demand, a fluid food of a desired consumption temperature, the method comprising using an automated device for dispensing desired quantities of water of a first temperature, water of a second temperature and formula into a vessel, so as to obtain fluid food of a desired consumption temperature, on demand.

According to features in the described preferred embodiments, the data processor and the controller are integrated on a single electronic chip.

According to features in the described preferred embodiments, the processor is operatively coupled with a user interface for displaying information related to the fluid food and for accepting input related to the fluid food, such that the controller controls the dispensing of the quantities of water and the quantity of formula according to the input.

According to further features in the described preferred embodiments, at least one of the reservoirs contains a heater for heating the water.

According to further features in the described preferred embodiments, more than one of the reservoirs contains a heater for heating the water.

According to further features in the described preferred embodiments, at least one of the reservoirs contains a heater for boiling the water.

According to further features in the described preferred embodiments, each of the reservoirs contains a heater for boiling the water.

According to further features in the described preferred embodiments, the heater is designed to operate and boil water in contact therewith, preferably for a period of at least twenty seconds. Although such boiling does not necessarily sterilize the water, one skilled in the art recognizes that the microbe count of such boiled water is significantly reduced.

According to further features in the described preferred embodiments, the reservoir is constructed so that steam produced by boiling the water therein remains captured and reliquifiable when cooled. An advantage of such a feature is that the composition of the water, for example the concentration of minerals, remains substantially unchanged despite periodic reheating. Importantly, the present invention allows at least about 20 seconds of boiling as recommended by health-care professionals.

According to further features in the described preferred embodiments, the heater is designed to operate and boil water periodically at predetermined intervals.

According to further features in the described preferred embodiments, the heater is designed to operate and boil water in contact therewith about every 1–5 hours.

According to further features in the described preferred embodiments, the heater is designed to operate and boil water in contact therewith about every 2–4 hours.

According to further features in the described preferred embodiments, the heater is designed to operate and boil water in contact therewith about every 3 hours.

According to further features in the described preferred embodiments, the heaters or respective reservoirs are synchronized to alternately periodically operate, such that at any given time, one of the reservoirs contains water at a temperature above the desired consumption temperature, and the other reservoir contains water at a temperature below the desired consumption temperature. A typical consumption temperature for food for human infants is generally between about 25° C. and about 35° C.

According to further features in the described preferred embodiments, the desired consumption temperature is between about 25° C. and about 35° C., the data processor and the controller being designed and configured for determining the quantity of water from each of the reservoirs needed to mix with the quantity of the formula in order to achieve fluid food having a desired consumption temperature.

According to further features in the described preferred embodiments, the container is designed and constructed for recharging with the food formulation when depleted.

According to further features in the described preferred embodiments, the container is prepackaged with formula and is disposable when depleted. Preferably such a disposable container has an automatically readable label having salient details concerning the formula contained therein. Such automatically readable label can, for example, include a radio transmitter, bar code or electric circuit. Clearly in such a case, the device of the present invention is appropriately modified so as to read the automatically readable label. Obviously, the device is preferably configured to reject an inappropriately labeled formula package.

According to further features in the described preferred embodiments, the container is designed and constructed to operably accept therein a prepackaged refill containing the formula.

According to further features in the described preferred embodiments, the device further comprises at least one additional container for holding at least one additional ingredient, the additional container having a controllable dispenser for optionally dispensing a predetermined quantity of the additional ingredient.

According to further features in the described preferred embodiments, the additional ingredient is at least one food supplement.

According to further features in the described preferred embodiments, the additional ingredient is at least one medicament.

According to further features in the described preferred embodiments, the additional ingredient is a flavoring.

According to further features in the described preferred embodiments, the container and the controllable dispenser for dispensing the formula on demand are designed and constructed so as to substantially avoid dispensing any of the formula so that the controllable water outlet will become contaminated with formula remnants.

According to further features in the described preferred embodiments, the fluid food produced by the invention is suitable for feeding a human infant.

According to further features in the described preferred embodiments, the fluid food produced is suitable for feeding a person needing or desiring liquid food.

According to further features in the described preferred embodiments, the processor communicates with a communication server for communicating data related to the formula and/or fluid food via a communications network.

According to further features in the described preferred embodiments, the method further comprises heating water contained in at least one of the reservoirs.

According to further features in the described preferred embodiments, the method further comprises heating water contained in each of the reservoirs.

According to further features in the described preferred embodiments, the method further comprises boiling water contained in at least one of the reservoirs.

According to further features in the described preferred embodiments, the method further comprises boiling the water for a period of at least 20 seconds.

According to further features in the described preferred embodiments, the method further comprises boiling the water such that steam produced thereby remains captured and reliquifiable when cooled.

According to further features in the described preferred embodiments, the method further comprises periodically reboiling the water at predetermined intervals.

According to further features in the described preferred embodiments, the method further comprises boiling the water every about 1 hour to about 5 hours.

According to further features in the described preferred embodiments, the method further comprises boiling the water every about 2 hours to about 4 hours.

According to further features in the described preferred embodiments, the method further comprises boiling the water about every about 3 hours.

According to further features in the described preferred embodiments, the method further comprises boiling water contained in each of said reservoirs.

According to further features in the described preferred embodiments, the method further comprises alternately periodically heating the water in each respective reservoir, so that at any given time one of the reservoirs contains water at a temperature above the desired consumption temperature, and the other reservoir contains water at a temperature below the desired consumption temperature.

According to further features in the described preferred embodiments, the method further comprises dispensing the formula so as to substantially avoid contaminating components of the device and especially the controllable water outlet with formula remnants.

According to further features in the described preferred embodiments, the method further comprises using the device for optionally dispensing a desired quantity of the additional ingredient.

According to further features in the described preferred embodiments, the method further comprises providing input to the processor via the user interface such that the device dispenses the desired quantities of water and of the formula according to the input.

According to further features in the described preferred embodiments, the method further comprises transmitting data (e.g. by wired or wireless means) related to the fluid food and/or formula to a remote location (e.g. to a health care provider, hospital, formula-manufacturing company). Data that may be desirable to transmit includes but is not limited to quantity of food prepared, quantity of food consumed, date and time, temperature and the like.

There is also provided according to the teachings of the present invention a method of selling fluid food comprising a. providing a device of the present invention in a publicly accessible location such as a store, an airport or the like; b. identifying the device with a mark associated with a formula manufacturer (such as a trademark, trade dress and the like), c. introducing in dispensers of the device a formula associated with the formula manufacturer; and d. providing a customer with fluid food made by the device. Usually parents are careful what food they give their infants. However, when parents encounter a device of the present clearly associated with a well-known formula manufacturer and knowing that a device of the present invention provides safe and hygienically prepared fluid food, they will purchase food from the device. In order to save the carrying of containers of formula, clean bottles and assorted paraphernalia, parents will preferentially flock to locations implementing the method of selling fluid food of the present invention.

The present invention successfully addresses the shortcomings of the presently known configurations by providing a method and a device for preparing a fluid food on demand at a temperature appropriate for consumption. Preferably water is boiled and resulting steam is captured and condensed back into the water such that the concentration of minerals and other substances in the water does not increase as a result of boiling. Preferably the number of microbes in the water is reduced or even eliminated, and the water stored so as to prevent outside contamination. Preferably the exact composition of fluid food produced can be varied according to user input, both on site and remotely. Preferably ingredients do not contaminate the device.

BRIEF DESCRIPTION OF THE DRAWINGS

With specific reference now to the drawings in detail, it is stressed that the particulars shown are by way of example and for the purposes of illustrative discussion of the preferred embodiment of the present invention only, and are presented in the cause of providing what is believed to be the most useful and readily understood description of the principles and conceptual aspects of the invention. In this regard, no attempt is made to show structural details of the invention in more detail that is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present invention is of a device and a method designed for the preparation of fluid food from formula at a desired consumption temperature on demand.

The principles and operation of a device and a method according to the present invention may be better understood with reference to the drawings and accompanying descriptions.

Before explaining at least one embodiment of the invention in detail, it is to be understood that the invention is not limited in this application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In case of conflict, the patent specification, including definitions, will control. In addition, the materials, methods, and examples are illustrative only and not intended to be limiting.

Figure 1A:
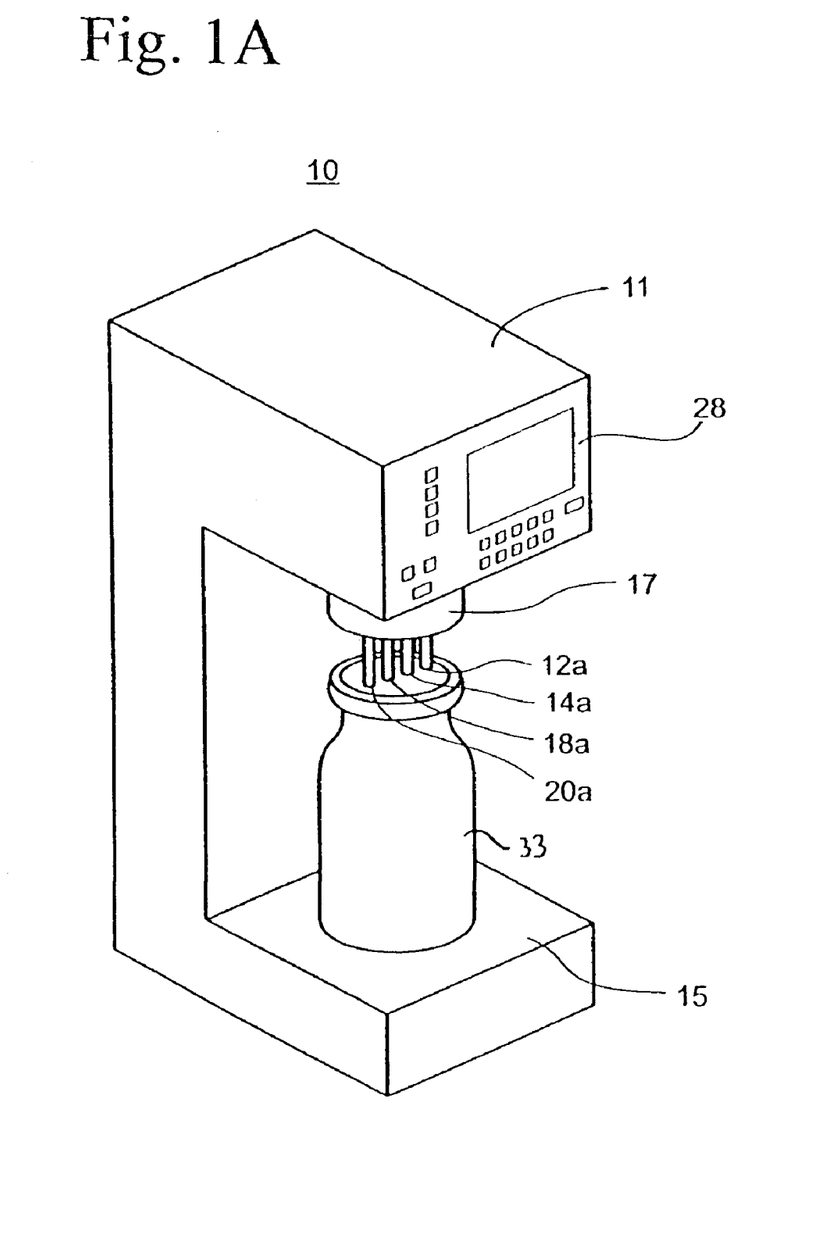
FIGS. 1A and 1B are pictorial views illustrating a feeding formula device constructed in accordance with the present invention.

Reference is now made to FIG. 1A that shows a pictorial view of a feeding formula device constructed in accordance with the teachings of the present invention, which is referred to hereinbelow as device 10.

Device 10 is designed and constructed to dispense two quantities of water of different temperatures from two reservoirs that are mixed with formula in order to prepare a fluid food of a desired consumption temperature.

Device 10 is preferably configured to dispense the water and the formula directly into a container such as a baby bottle so that the fluid food thus prepared is ready to be served to a baby.

Device 10 will hereinafter be described in this context, although it is understood that device 10 may be employed for preparing any fluid food comprising water and a dry (e.g. powdered) formula, or water and a liquid formula (e.g. concentrate), for any purpose.

Such fluid food may be for oral ingestion by ill persons, those who cannot ingest or digest solid materials or persons on restricted diets. Device 10 may be used for preparing enteral feeding formulas or even feeding formulas for animals. Therefore, the reference to a baby bottle, hereinafter referred to as bottle 26, is solely exemplary and is not limiting to the scope of the invention. Any baby bottle or any other drinking or administering vessel with acceptable dimensions may be substituted in appropriate circumstances.

Device 10 comprises a housing 11 which has a user interface 28 for displaying data and information related to a fluid food and/or formula to a user and for accepting input from a user related thereto. Interface 28 will be discussed more fully hereinafter with respect to FIG. 4. Housing 11 includes a vessel sealer 17 which descends to seal the opening of bottle 26 when it is being filled, preferably four conduits 12a, 14a, 18a and 20a for introducing ingredients into bottle 26, and base 15 on which bottle 26 rests when being filled.

Figure 2:
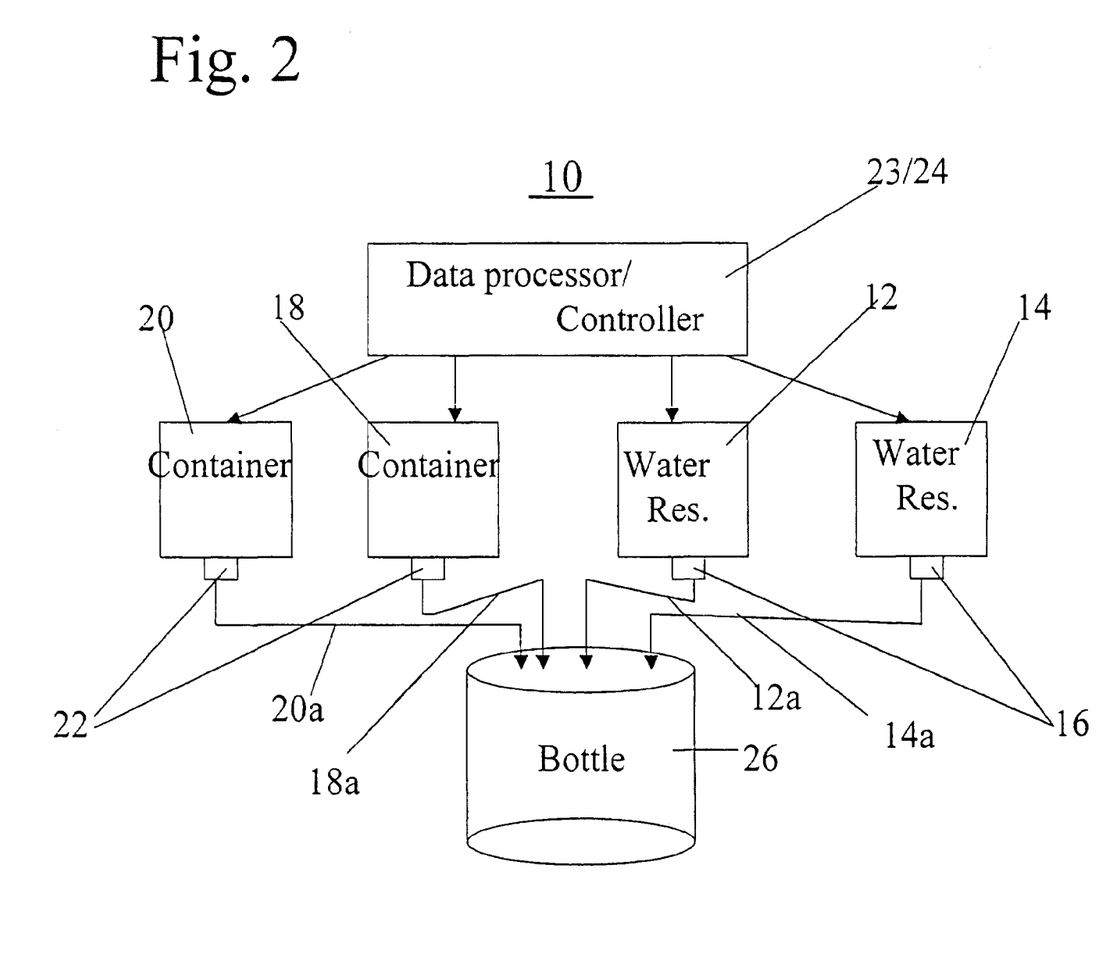
FIG. 2 is a schematic diagram of the device of FIG. 1.

Reference is now made to FIG. 2 that shows a schematic diagram of components of device 10. Device 10 comprises at least two water reservoirs, hereinafter referred to as reservoir 12 and reservoir 14 respectively. Reservoirs 12 and 14 may vary in size depending upon the frequency of use of device 10. For example, if device 10 is used at home for a single infant, the capacity of reservoirs 12 and 14 will preferably be a maximum of one liter each, so that water therein will not stand and become stale after a long period. On the other hand, if device 10 is used for a number of babies, it may reasonably employ larger reservoirs 12 and 14 or may have an additional integral or auxiliary feeder reservoir (not shown) which supplies reservoirs 12 and 14 with water on an as needed basis, possibly using automatic demand valves such as a float activated needle valve such as found in an auto engine carburetor or in a toilet tank.

In a preferred embodiment of the invention, reservoirs 12 and 14 are each provided with a heater (shown in FIG. 3) for the purpose of heating the water therein. Device 10 boils the water in reservoirs 12 and 14 for a period of at least twenty seconds, preferably for a period of five minutes or more, in order to assure sterilization. The boiling is carried out in such a way that the steam produced thereby does not escape into the atmosphere but is captured so that the steam is reliquifiable upon condensation when cooled and returned to the water body within each reservoir 12 and 14 so that the boiling process does not result in increased concentrations of minerals, chemicals or other elements. Such boiling is carried out, for each of the reservoirs, periodically every one to five hours, or every two to four hours or preferably every about three hours. In a preferred embodiment, the heaters of reservoirs 12 and 14 are synchronized to alternately periodically operate, so that the boiling of the water in each reservoir 12 and 14 is offset such that at any given time, one of reservoirs 12 and 14 contains water at a temperature above the desired consumption temperature and the other of reservoirs 12 and 14 contains water at a temperature below the desired consumption temperature, such that, at any given time, it is possible to mix calculated proportions of water from reservoirs 12 and 14 to yield water at the desired consumption temperature.

Reservoirs 12 and 14 also have deployed therein thermal sensors for detecting the temperature of the water contained therein. The purpose and functioning of the sensors will be discussed more fully hereinafter with respect to FIG. 3, in which they are shown.

Each of reservoirs 12 and 14 also has a controllable water outlet 16 which is operable at demand by a controller 24, described hereinafter. Each outlet 16 preferably has a conduit leading from it to the entrance of bottle 26. The conduits are designated 12a and 14a respectively, signifying the reservoir from which they convey water to bottle 26.

Device 10 also comprises a container 18 for holding formula, e.g., a dry or liquid formula.

Container 18 may be any appropriate sized container consistent with the quantity of food formulation to be held and dispensed. As with water, it is not wise to have a large quantity of the food formulation remain in container 18 for extended periods of time where it may be subject to quality-degradation due to the effects of humidity, temperature, light and atmospheric oxygen. It is preferable to store formula stored under inert and protected conditions and introduce into container 18 only the amount to be dispensed in the near future. As is well-known tone skilled in the art, certain additives such as essential-fatty acids decompose quickly when exposed to oxygen, humidity or light. The teachings of the present invention allow for the heretofore unknown easy, effective and wide-spread use of such sensitive yet important nutrients.

Container 18 may be designed and constructed so as to be rechargeable by a user when depleted. Container 18 may be prepackaged with formula and be disposable when depleted. Container 18 may further be designed and constructed as an appropriate carriage to operably accept a prepackaged refill containing a formula. It is appreciated that container 18 may be of any appropriate design and size and may be fabricated of any appropriate non-toxic, non-contaminating inert material.

Device 10 optionally comprises at least one additional container 20 for holding at least one additional ingredient. Because device 10 is preferably a versatile device configured to allow the preparation of a wide variety of fluid foods, different embodiments may have varying numbers of containers 20 for optionally dispensing additional ingredients into the mix of components making up a fluid food. Additional ingredients may be food supplements, flavorings, additional nutritional components, medicaments, or any appropriate additives required by the subject for whom the fluid food is being prepared. It is understood that additional containers 20 and any ingredients that they may contain are not essential features of device 10.

Both containers 18 and 20 have controllable dispensers 22 for dispensing a quantity of formula or the additional ingredient. Each dispenser 22 preferably has a conduit leading from it to the entrance of bottle 26. The conduits are designated 18a and 20a respectively, signifying the container from which they convey the formula or the additional ingredient to bottle 26. Dispenser 22 may be of any type that dispenses the material contained within its respective container and assists in the material's flow through conduits 18a and 20a, respectively, into bottle 26. Dispenser 22 may be a simple butterfly valve or other rotational mechanism that opens and closes by rotating a baffle or other obstruction within an opening, or it may be a pressure application that closes an opening by elastic deformation. Dispenser 22 may allow formula to flow by gravity, or it may be a more complex discharge mechanism with a substance-moving element such as a screw or translating cylinder to mechanically transport the formula, or it may employ a vibrating mechanism to assist the gravitation-aided movement of the formula from dispensers 22 into bottle 26. It is appreciated that different types of dispensers 22 may be required for different types of ingredients depending on the consistency, adhesiveness, viscosity and other characteristics of the ingredient. The specific type of dispenser 22 is not material to the invention. Many such dispensing mechanisms are known for both wet and dry materials and any appropriate dispensing mechanism according to present or future technology may be employed in device 10.

Containers 18 and 20, and their respective dispensers 22, will preferably be designed and constructed so as to substantially avoid dispensing any of the formula or additional ingredients in such a way that the formula, additional ingredients or remnants thereof come into contact with the controllable water outlets 16 and thereby contaminate them.

Figure 1B:
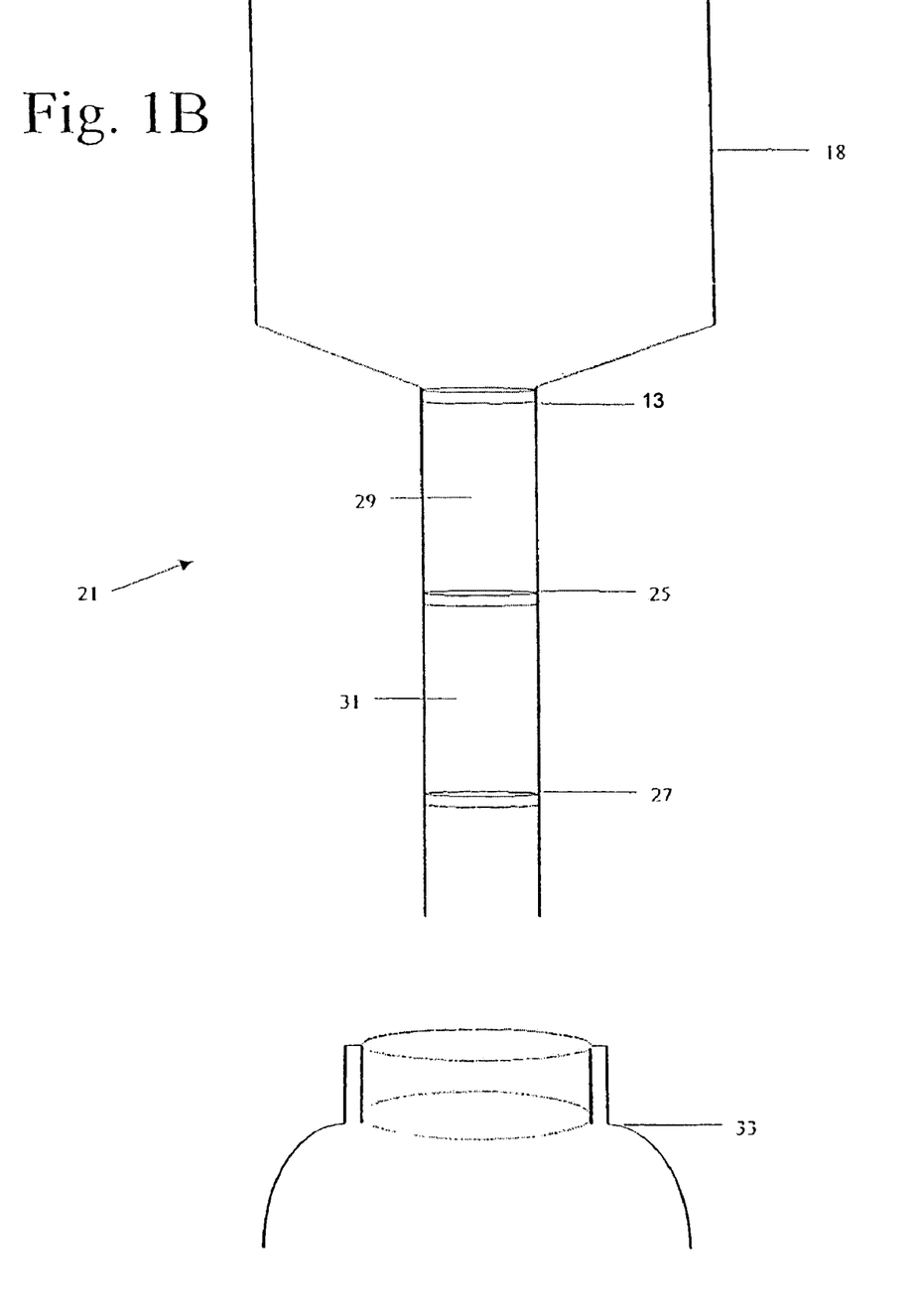

One example of a dispenser 22 designed so as to protect formula in a respective container 18 from contamination is depicted in FIG. 1B. In FIG. 1B, dispenser 22 includes a tube 21 having a first valve 13, a second valve 25 and a third valve 27 dividing tube 21 into a first chamber 29 and a second chamber 31. Each one of the three valves 13, and 27 is configured to be independently toggled between an open and closed state. When necessary a respective controller opens first valve 13. As container 18 is consequently in communication with first chamber 29, formula from container 18 falls into first chamber 29. When a desired amount of formula has entered first chamber 29, first valve 13 is closed end second valve 25 opened. As first chamber 29 is consequently in communication with second chamber 31, formula fall from first chamber 29 into second chamber 31. Second valve 25 is closed and third valve 27 opened. Formula in second chamber 31 falls into vessel 33.

Both outlets 16 and dispensers 22 are preferably designed and configured to affirmatively mix the water with the formula. In this connection, both may be designed to pass the water through the formula on the way into bottle 26, or both may be designed to spray the contents into bottle 26 under pressure and thus effect mixing. In general, mixing may be accomplished in different manners or may be simply left to the user to manually agitate bottle 26 after the water, formula and any additional ingredients are dispensed therein.

In order to provide versatility, device 10 is designed and configured for preparing fluid food with a wide range of variation in components, proportions of components and temperature.

For example, different types of water may be used. Tap water or preferably mineral water may be used in the majority of fluid food, whereas some infants will need demineralized or deionized water. Such water can be purchased commercially or may be prepared by distillation or by passing tap water through a column containing beads of material with an affinity for the ions of the water. Further, the required water may need to be filtered or purified in some manner in order to remove particles or substances present, and therefore alternative embodiments of device 10 may preferably contain a filtration, osmosis or deionization device. Many such devices are known and commonly available commercially, such as under-sink installations for home use.

An advantage of the present invention is that the use of such "designated" water types can easily be implemented. As is well known, the mineral content of water depends on its source, leading to an undesirable inconsistency in the produced fluid food. When designated water is used it may be commercially advantageous to configure the device to accept only water vessels of a certain water supplier.

In addition, different types of formula may be required and therefore a range of different ingredients may be needed. Most researchers and authorities agree that breast-fed infants have advantages in terms of general health. They have a more effective immune system and are therefore less sensitive to infections, mental development is faster and they are less fat. Also, there are indications that breast-feeding leads to better health when the infant grows to be a child or adult. For example, breast-fed children are less prone to develop juvenile diabetes, heart diseases and obesity. For further advantages of breast-feeding, the reader is referred to Am. J. Clin. Nutr. 40:635–646, 1984, which is incorporated by reference as if fully set forth herein.

Therefore, formula-producers invest a lot of effort in developing formulas as close as possible in composition to human milk. Such formulas may be based upon cow or goat milk or may be non-milk based such as soy based, provided that they are similar or compatible at least in fat and amino acids composition and content and/or other ingredients to human milk. Many different compositions of each are available on the market. For example, milk-based formulae may include lactose, vegetable oils, skimmed milk powder, whey protein concentrate, sodium, calcium, phosphorus, potassium, chloride, iron, magnesium, taurine, essential fatty acids (such as DHA-ARA), "bio" bacteria and vitamins. Soy based formulae may include glucose syrup, vegetable oils, soy protein isolate, sucrose, maltodextrine, sodium, calcium, phosphorus, potassium, chloride, iron, magnesium, vitamins, methionine, taurine, carnitine, essential fatty acids, "bio" bacteria and trace elements.

In addition to different food formulae, other ingredients may be required in fluid food given to infants, including medicaments, flavorings, and the like, thus further diversifying the mix of ingredients. Most importantly, it is expected that genetic analysis will lead to genetically-based personalized nutrition recommendations for infants as well as adults. Such personalized formulae can be easily prepared using the device of the present invention.

In summary, fluid food with an extremely wide range of variations may be prepared with device 10 in order to meet the needs of many consumers. Device 10 carries out the adjustments necessary to achieve these variations automatically. Accordingly, device 10 further comprises a data processor 23 for determining the proportions of the components required to make a required fluid food, for controlling the quantity of the components dispensed and for assuring that the fluid food is served at the desired consumption temperature.

Data processor 23 is preferably a computer including RAM (random access memory) or a functional equivalent which serves as a temporary buffer for data inputs and outputs, and ROM (read only memory) or a functional equivalent that serves for the storage of data and of software programs. Because device 10 may have, in its various embodiments, a wide range of data processing needs, it is understood that the term "computer", as used herein, has a broad definition, ranging from a simple logic circuit for simple comparisons of data to a computing platform with substantial power for making complex calculations. Accordingly, data processor 23 may have any known operating system such as DOS, Windows, OS, Linux; JAVA™-OS or any version of the UNIX operating system such as AIX™ or SOLARIS™ of Sun Microsystems™; or any other known and available operating system.

Data processor 23 carries out two primary functions. Its first function is to determine the correct quantity of water from each of reservoirs 12 and 14 needed to mix with the formula in order to achieve a fluid food at the desired consumption temperature on demand. Data processor 23 is operably coupled with thermal sensors within each of reservoirs 12 and 14 and receives thermal records therefrom. Based upon data received from the thermal sensors, the energy of solvation of the formula (if desired), and also, optionally, from input supplied by a user, processor 23 calculates the correct amount of water from reservoir 12 and from reservoir 14, at their current temperatures, that is needed to mix together to achieve the desired consumption temperature of the fluid food to be served. This function is effected via a simple logic circuit which is operably coupled to thermal control circuitry, of which the thermal sensors within reservoirs 12 and 14 form a part, which will be further described with reference to FIG. 3.

Data processor 23 is further operably coupled to a controller 24 that controls outlet 16 such that the correct quantity of water from each of reservoirs 12 and 14 is dispensed and mixed together to form fluid food of the appropriate desired consumption temperature. The temperature of infant fluid food should preferably approximate as closely as possible the normal consumption temperature of nursing, which is preferably between about 25 to about 35 degrees centigrade. It is understood that the desired consumption temperature of other feeding formulas for other purposes may vary as needed and as deemed to be appropriate to use.

The second primary function of data processor 23 is to determine the correct quantity of formula and any other ingredients needed in order to achieve the desired composition of a fluid food. This function is effected based upon user input indicating the nature and composition of the fluid food desired and by programming processor 23 to provide the correct quantities of the appropriate ingredients to create the desired fluid food. Data processor 23 is operably coupled to controller 24 that similarly controls dispensers 22 such that the correct quantities of the appropriate ingredients are dispensed. The above described two functions together serve to mix water of the correct temperature with the correct quantities of the appropriate ingredients to prepare the desired feeding formula at the desired consumption temperature.

It is clear to one skilled in the art, that if it is chosen to include the heat of solvation and/or heat capacity of formula when calculating the temperature of fluid food to be made, the amount of formula added will first be calculated so as to allow accurate calculation of the relative amounts of water dispensed from the reservoirs.

It is appreciated that data processor 23 and controller 24 may be separate components or may be integrated on a single electronic chip. The architecture of the configuration is immaterial so long as data processor 23 and controller 24 are operably coupled together. Moreover, it is immaterial to the invention which dispensing method controller 24 employs to dispense the water from reservoirs 12 and 14 and to dispense the formula and other ingredients from containers 18 and 20.

Figure 3:
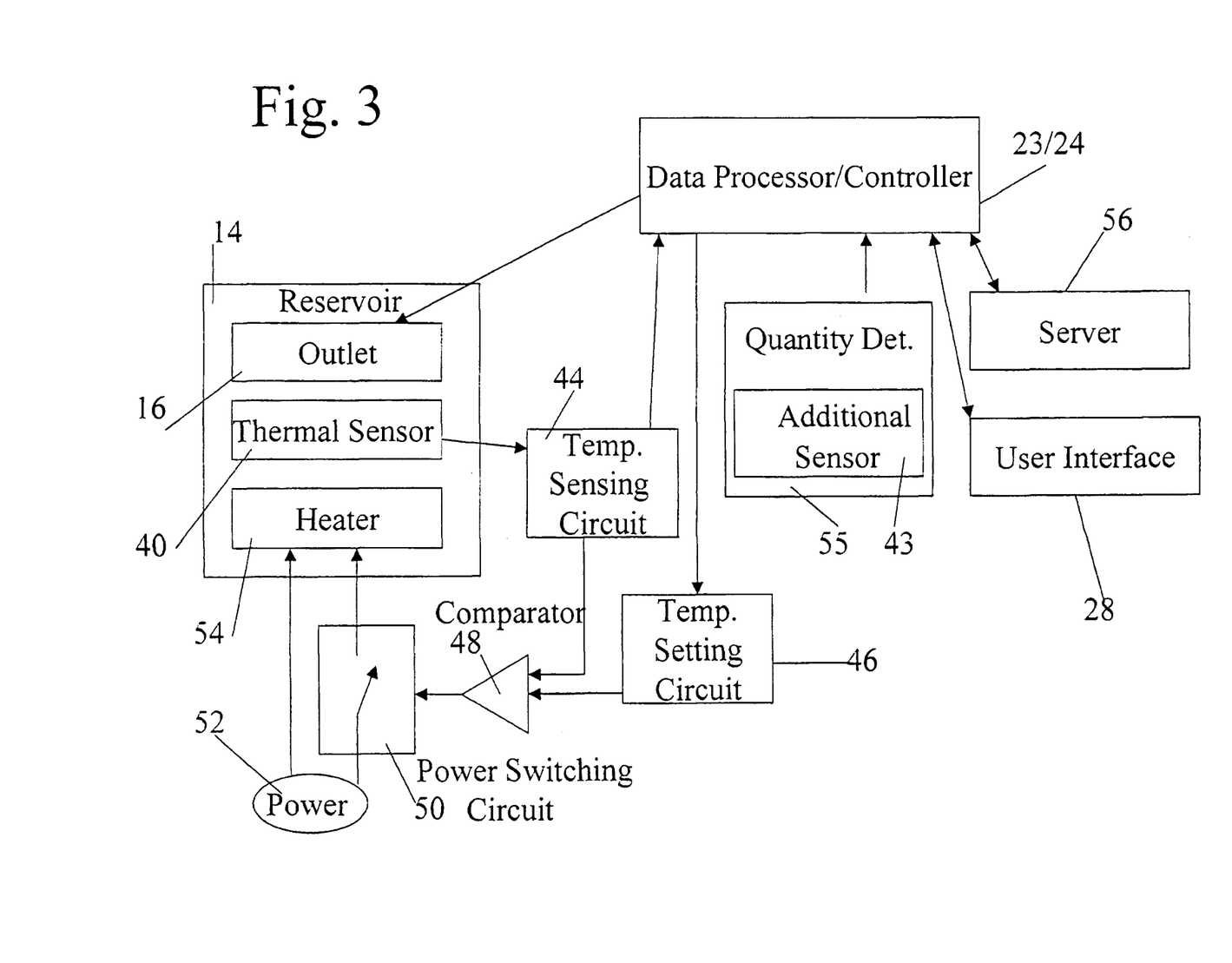
FIG. 3 is a block schematic diagram of a portion of the control circuitry of the device of FIG. 1.

Reference is now made to FIG. 3, which shows a block schematic diagram of a portion of the control circuitry of device 10. A power source, preferably the 100V or 220V AC current commonly in use where device 10 is employed, is shown as power source 52. It is appreciated that device 10 may be configured to operate on any level or type of power, AC or DC and with a range of voltages.

According to the circuitry shown, power flows to power switching circuit 50, which can be a relay or a solid state device, which turns power on and off to heater 54 which is deployed within reservoir 14. It is understood that power also flows to all of the other power-activated elements of device 10 which are not shown in FIG. 3.

Data processor 23 preferably controls the passage of power to heater 54 under two circumstances. The first circumstance is according to the programming of data processor 23 that activates heater 54 preferably every three hours for periodically reboiling the water. It is understood that device 10 also includes reservoir 12, not shown in FIG. 3. Accordingly, data processor 23 activates the heater in reservoir 12 corresponding to heater 54 also preferably every three hours for periodically reboiling the water therein. As mentioned above, in the preferred embodiment, the two heaters are synchronized to alternately periodically operate, such that at any given time, one reservoir has water at a temperature above the desired consumption temperature and the other reservoir has water at a temperature below the desired consumption temperature.

The second circumstance is to assure that the water does not drop to a temperature below a predetermined minimum in between boilings. This second activation is governed by temperature sensing circuit 44 that is coupled to thermal sensor 40. Thermal sensor 40 is preferably a thermistor located within reservoir 14 in a location representative of the average temperature of the water being dispensed. The combination of circuit 44 and sensor 40 essentially forms a thermostat. Other types of thermostats may be substituted. One example of an electronic thermostat is found in U.S. Pat. No. 5,063,836. The thermostat may also be a conventional mechanical circuit. Furthermore, the thermostat and heater 54 may be incorporated into a single unit and placed in the reservoir. An example of such units, commonly used in aquariums, is shown in U.S. Pat. No. 4,142,793.

Data processor 23 is programmed to maintain a minimum temperature within reservoir 14. This temperature parameter is sent as data to temperature setting circuit 46 for use in determining whether power should flow to heater 54.

Comparator circuit 48 receives a signal indicative of the current temperature of water in reservoir 14 from temperature sensing circuit 44 and further receives a signal from temperature setting circuit 46 which is representative of the set minimum temperature. It compares the two signals and provides a logic signal indicating whether the water temperature is above or below the set temperature. An output signal from comparator 48 operates power switching circuit 50. Power switching circuit 50 is closed to provide power to heater 54 when comparator 48 provides a signal indicating that the water temperature is below the minimum temperature indicated by the signal from temperature setting circuit 46.

Temperature sensing circuit 44 also provides a signal indicating the actual water temperature to data processor 23 that in turn provides the signal to user interface 28, not shown but described hereinafter in FIG. 4. The user interface is provided with the circuitry necessary to create the desired output display, which could be a digital LED or LCD readout or an analog dial.

Device 10 may also be configured to provide a final temperature check after all fluid food components have been dispensed into bottle 26. In this regard, device 10 may preferably comprise a secondary heater and circuitry, not shown, as a failsafe measure in order to assure that a fluid food is prepared at the desired consumption temperature. This secondary heater may be a coil, a convector or an infrared heater deployed under or adjacent to bottle 26 in order to administer heat if required after the dispensing of all of the components thereinto. The circuitry to activate this secondary heater is similar to the circuitry described above with respect to heater 54 but comprises an additional thermal sensor deployed in association with bottle 26 when in its filling position. In this respect, the additional thermal sensor may be on base 15 such that it comes into contact with bottle 26 when bottle 26 is placed thereon for filling, or it may be a submersible sensor that is inserted into bottle 26 during or immediately after filling.

It is a feature of device 10 to provide a versatile array of fluid foods consisting of varying mixes of ingredients. The composition of such fluid foods is programmed into data processor 23 and data processor 23 is operable to cause the dispensing of predetermined quantities of each ingredient needed to prepare each of such fluid foods. Accordingly, device 10 also preferably comprises a quantity detector 55 to serve as a check upon the dispensing in order to assure that the correct quantities of each ingredient have been dispensed into bottle 26. Quantity detector 55 comprises additional sensor 43 which is preferably a weight sensor placed on or under base 15 such that the weight of bottle 26 is monitored when bottle 26 is placed upon it for filling. Many small electronic weight sensors are known in the art and therefore neither further description nor explanation is required.

Data from quantity detector 55 representing the measured quantity is provided to data processor 23 that is operably coupled to controller 24. Based upon a comparison between the predetermined quantity and the measured quantity, data processor 23 will provide a logic signal to controller 24 indicating whether the measured quantity is more or less than the predetermined quantity for that ingredient. If the quantity is less, controller 24 will cause the dispensing of the needed amount of the ingredient in question; if the quantity is more, controller 24 may preferably cause the dispensing of the needed compensatory amounts of the other ingredients in order to preserve the required proportions.

Similarly, quantity detector 55 may be used to determine the quantity remaining in a bottle after feeding in order to prepare the subsequent bottle. This feature is especially useful if the fluid food includes a medicament that must be taken in precise quantities. Any medicament not ingested in an unfinished bottle must be provided in subsequent feedings.

The logic circuitry of quantity detector 55 is not shown but is similar to that employed with respect to the provision of power to heater 54 hereinbefore described.

Figure 4:
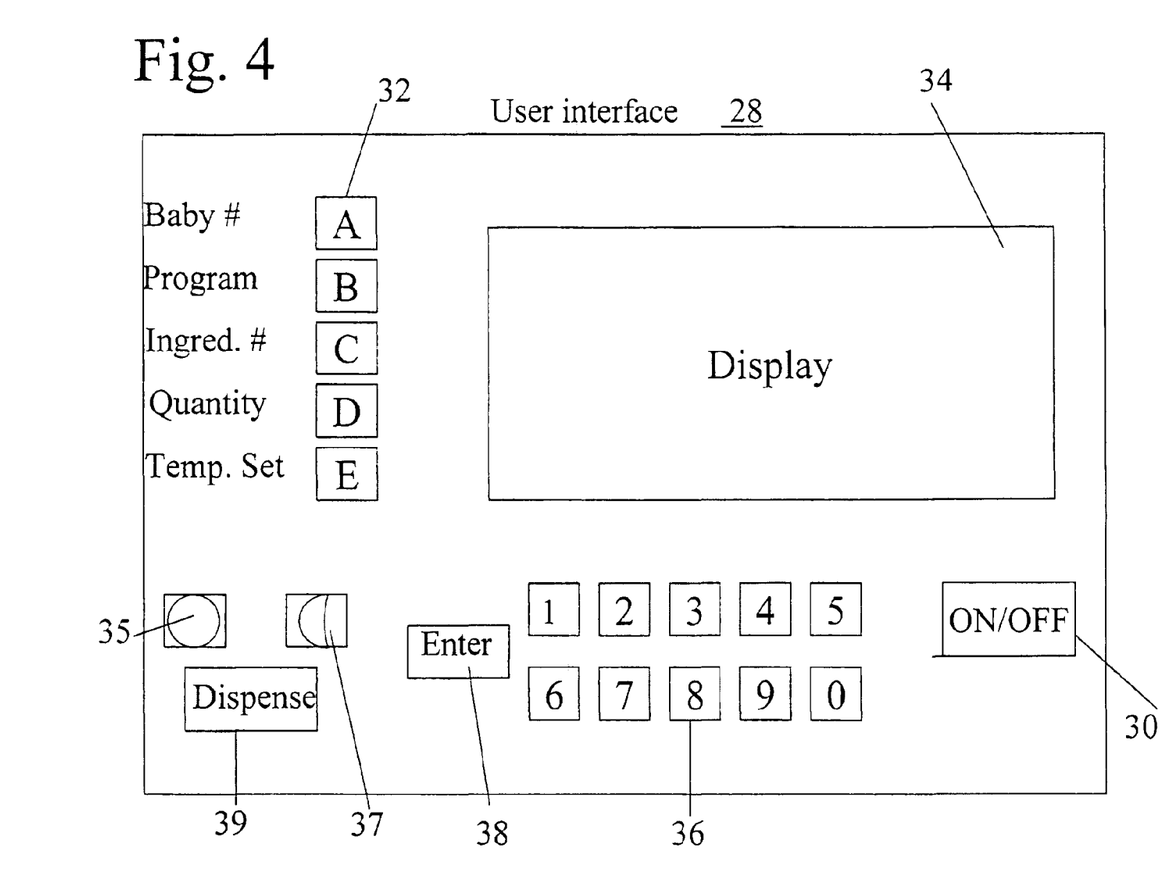
FIG. 4 is a schematic diagram illustrating a preferred embodiment of the user interface of the device of FIG. 1.

Reference is now made to FIG. 4 which is a schematic diagram illustrating a preferred embodiment of user interface 28 of device 10. Device 10 is designed to be programmable and to both provide a user with data and information and also to accept input from a user to decide the composition, quantity and temperature of the fluid food to be prepared.

It is understood that interface 28 depicted is solely exemplary and is so depicted to show representative features that may be included in any interface 28 provided in the various embodiments of which device 10 is capable. Therefore, it is understood that embodiments of device 10 need not have every one of the features and elements shown and may have additional features and elements not shown. Moreover, the features and elements shown may be arranged in any convenient or esthetically pleasing design including being located separately in different locations on housing 11 of device 10.

Interface 28 is preferably disposed upon housing 11 in a location and orientation providing easy access and clear visibility. Interface 28 will preferably have an on/off button or switch 30 permitting a user to provide power and to cut off power to device 10.

Interface 28 preferably includes a visual display 34 that serves as an output interface. Device 10 communicates with a user via display 34 that is preferably an LCD monochrome or color display screen capable of showing text. It is appreciated that alternate embodiments may be capable of showing graphics and still or moving graphic and photographic images. It is further appreciated that future embodiments may have screens of larger or smaller dimensions, capable of displaying more or less or different types of data. Interface 28 may also include an auditory output interface (not shown), such as an integral speaker, for providing audible signals such as alerts, warnings or information regarding certain conditions that prevail, such as low water levels and the like.

Display 34 may also, in alternate embodiments, serve as an input interface and be used for the input of data. According to an alternate embodiment, display 34 could include a touch sensitive digitizer pad that can detect contact by any type of pointer, from a stylus to a simple finger touch. Housing 11 could preferably include an integrally stowed stylus for this purpose. Through such a touch sensitive display 34, interface 28 could input data in a number of different modes. First, it could display a virtual and touch functional keyboard that replicates a standard alphanumeric keyboard. In order to key in data, the user touches display 34 on the desired key of the keyboard and the character of that key appears in the open field. Display 34 could display scrolling or windows-like data menus from which alternatives are selectable by touch. Thus, display 34 could allow entry of data by touch selecting the desired data from displayed lists or menus. Display 34 could serve as a sensor for character recognition that recognizes a tracing and replaces the recognized character with a legible and easily identifiable version in the desired location.

According to the preferred embodiment, the primary input capabilities of interface 28 will be via a plurality of finger-pressable buttons. It is understood that the following description of the use, function and designation of the buttons is solely exemplary and any configuration, combination or marking of buttons that effect the functioning of device 10 may be used.

Interface 28 includes a plurality of function selection buttons, referred to hereinafter in the aggregate as buttons 32, designated according to function by the letters A through E. Pressing each button with a fingertip or other object will cause the relevant function to be activated. Accordingly, interface 28 will display information or data related to the function selected and will accept input related thereto.

Button A is labeled "Baby #" and is essentially a consumer selector. By pressing button A, a user designates the baby for whom a fluid food is being prepared. When button A is pressed, the identity of a particular baby whose feeding details have been programmed into data processor 23 is displayed on display 34. By repeated presses of button A, successive babies are identified. Such selection is desirable, as individual babies may have individually formulated fluid foods. Such an option is exceptional useful in situations where the device is planned to serve a plurality of individuals, for example in a hospital, a creche, or in a home with twins, triplets and so forth. Even more, such an option is of critical importance when personalized infant food is required, for example due to medical indications.

With respect to the essential function of identifying the consumer of the food prepared, it is important to note that in applications where there are many users of device 10, such as in hospitals or institutions, measures may be taken to assure that misidentification does not occur. This is particularly true where unique foods not widely tolerable are in use or where medicaments are being administered. In the medical field, almost all information is confidential. Such measures may include secret passwords or personal identification numbers (PIN), or the use of bar coded cards scannable by an infrared port, magnetic cards readable by a reader device, or any other identification methods that may be invented and incorporated within future embodiments of device 10. As such security features are well known in the art, these are not shown nor described hereinfurther.

A user may command device 10 to prepare an already programmed fluid food for a specific baby by simply pressing "dispense" button 39 when that baby's identity is displayed. Device 10 will preferably have the capability to provide full bottles or partial bottles of a fluid food. Accordingly, interface 28 will have input buttons indicating which quantity is desired. Shown in this respect is button 35 marked with a full circle indicating a full bottle and a button 37 marked with a half circle indicating that a half bottle is desired. Alternate embodiments may prepare different fractional quantities and will be appropriately marked or designated.

A user may alternatively revise an already programmed fluid food for a specific baby when that baby's identity is displayed by pressing "program" button B. "Program" button B will cause the parameters of a previously programmed fluid food, including but not necessarily limited to ingredients, quantities and temperature, to be displayed on display 34. Thereafter, buttons C, D and E may be used to respectively display fields in which each of the named parameters appears and may be revised. Specifically, button C will display a field in which each ingredient is listed sequentially. Ingredients may be added or subtracted. Button D will display a field showing the quantities of each ingredient and will allow quantities to be increased or decreased. Button E will display a field with the desired temperature of the fluid food that can be revised upward or downward. During the period that any field is displayed, the listed parameter may be revised by pressing the input buttons, referred to hereinafter in the aggregate as buttons 36, designated according to number by the digits 1 through 0. Pressing each button with a fingertip or other object will cause that digit to be entered into the field and to replace an already entered digit in the field, thereby revising the previous input relevant to that field. For example, if the field displayed was "temperature", displayed due to pressing function button E, thereafter pressing buttons "3" and "4" will enter the temperature 34 degrees in place of the existing temperature displayed in the field. After all of the desired parameters have been displayed and revised as described, pressing "enter" button 38 will program data processor 23 to revise the fluid food for the identified baby accordingly.

A user may alternatively program data processor 23 with a new fluid food for a new baby. The first step is to press button A repeatedly until "new baby" or another designation for a new consumer of food appears in the field. Thereafter, a user enters identity data for the new baby via input buttons 36, and presses "enter" button 38 to record the data entered. Thereafter, the steps previously set forth with respect to revising a feeding formula are carried out. In this circumstance, the fields displayed will be blank and ready to accept new data. When all of the desired data is inputted, the user presses "enter" button 38 to program data processor 23 with the fluid food for the newly identified baby.

It will be appreciated that the number, configuration, location and function of all of the input and output components of interface 28 are not critical elements of the design of user interface 28 nor of device 10 and further embodiments may deploy these components in various ways, including the inclusion of jacks and ports comprising open architecture whereby remote input and output devices may be employed.

Figure 5:
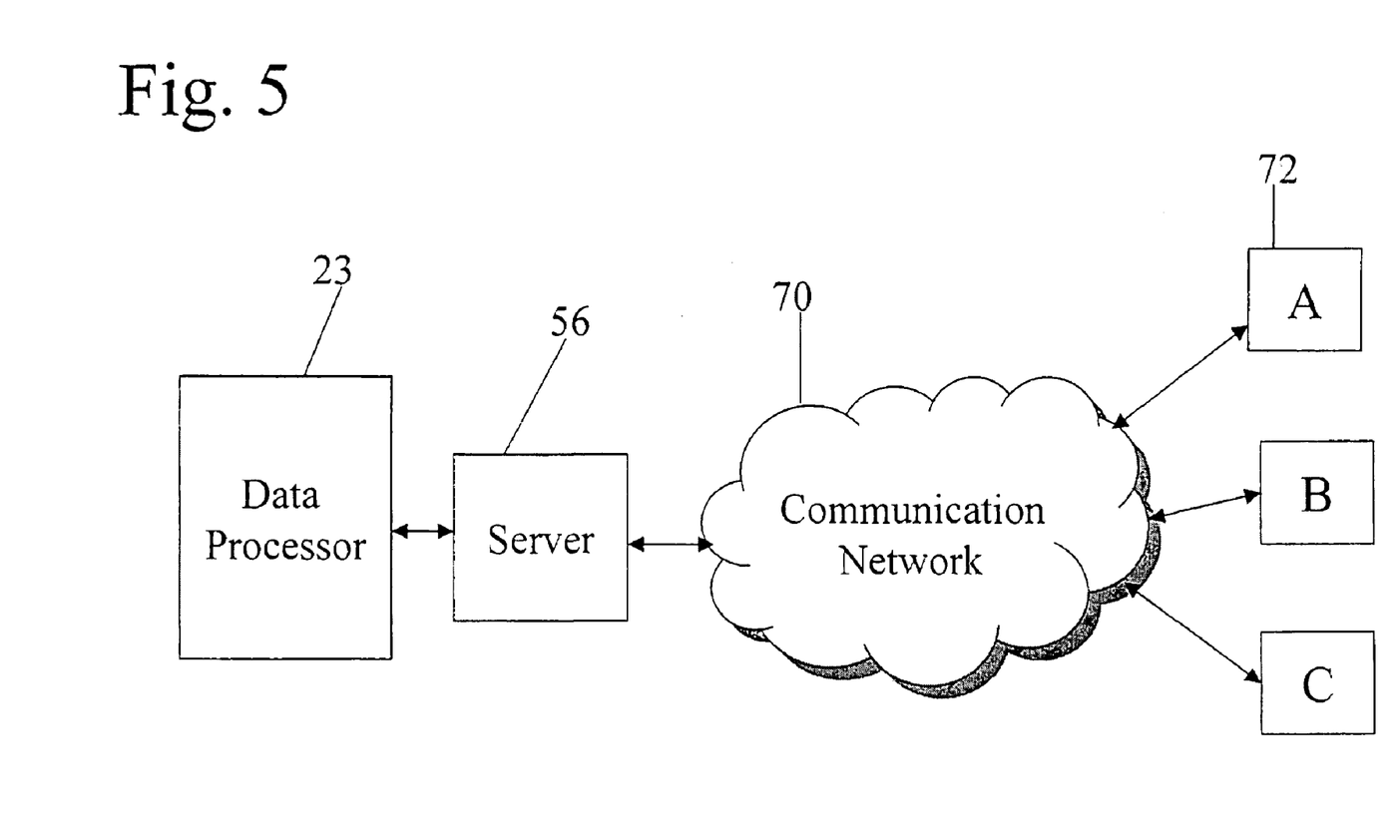
FIG. 5 is a block diagram illustrating the communication of data by the device of FIG. 1 via a communications network.

Reference is now made to FIG. 5 that illustrates the communication of data relating to formulae and/or fluid foods via a communications network. Device 10 is preferably equipped for both sending and receiving data related to formulae and/or fluid foods. Simply described, device 10 will preferably be capable of receiving input related to the preparation of a fluid food using an available formula from a remote source and will similarly be capable of providing user output to a remote source.

Data processor 23 is associated with server 56 for communicating data. The term "server" refers to a computing platform capable of processing, storing, and communicating information over a communications network. Server 56 effects communication with a communications network 70. The term "communications network" refers to the Internet as manifested by the World Wide Web (WWW) of computers, and to Intranets or Extranets or any other open or closed communications networks, including GSM and GPRS cellular networks, satellite networks, cable networks and local area networks, either wired or wireless.

Server 56 is preferably for communicating with a plurality of user clients, referred to hereinafter both individually and collectively as user client 72. As used herein, the term "user client" refers to a device which is communications enabled and which allows a user to communicate with device 10 or with server 56. A user client 72 can be, for example, a computer, a PDA, a telephone, a cellular communication device or another server, each being a unique device type as classified according to intended use, mode of communication, mobility and/or the like. Server 56 may preferably communicate with a number of user clients 72, such as, for example those operated by the baby's physician, a pharmacy, alternate caregivers, the baby's parents, etc. Such user clients 72 are designated A, B and C in FIG. 5.

Accordingly, device 10 is preferably provided with one or more of a range of communication apparatus that allows device 10 to communicate directly through either a hardwire communication mode (e.g., dial-up, LAN, or WAN) or a wireless communication mode (e.g., infrared or radio frequency) or a combination thereof. Device 10 can include a Wi-Fi, BLUETOOTH chip, or any other wireless solution that will enhance its versatility and mobility, allowing it, for example, to access the Internet from a plurality of access points. For purposes of such communication, device 10 preferably includes either or both a wired communications port and a wireless communications port.

It will be appreciated that the list of user client types, the list of devices that constitute a computer and the list of communications networks are not to be regarded as limiting. Further embodiments of device 10 may adopt all emerging technology to communicate in every way and with every device that advances its function.

Figure 6:
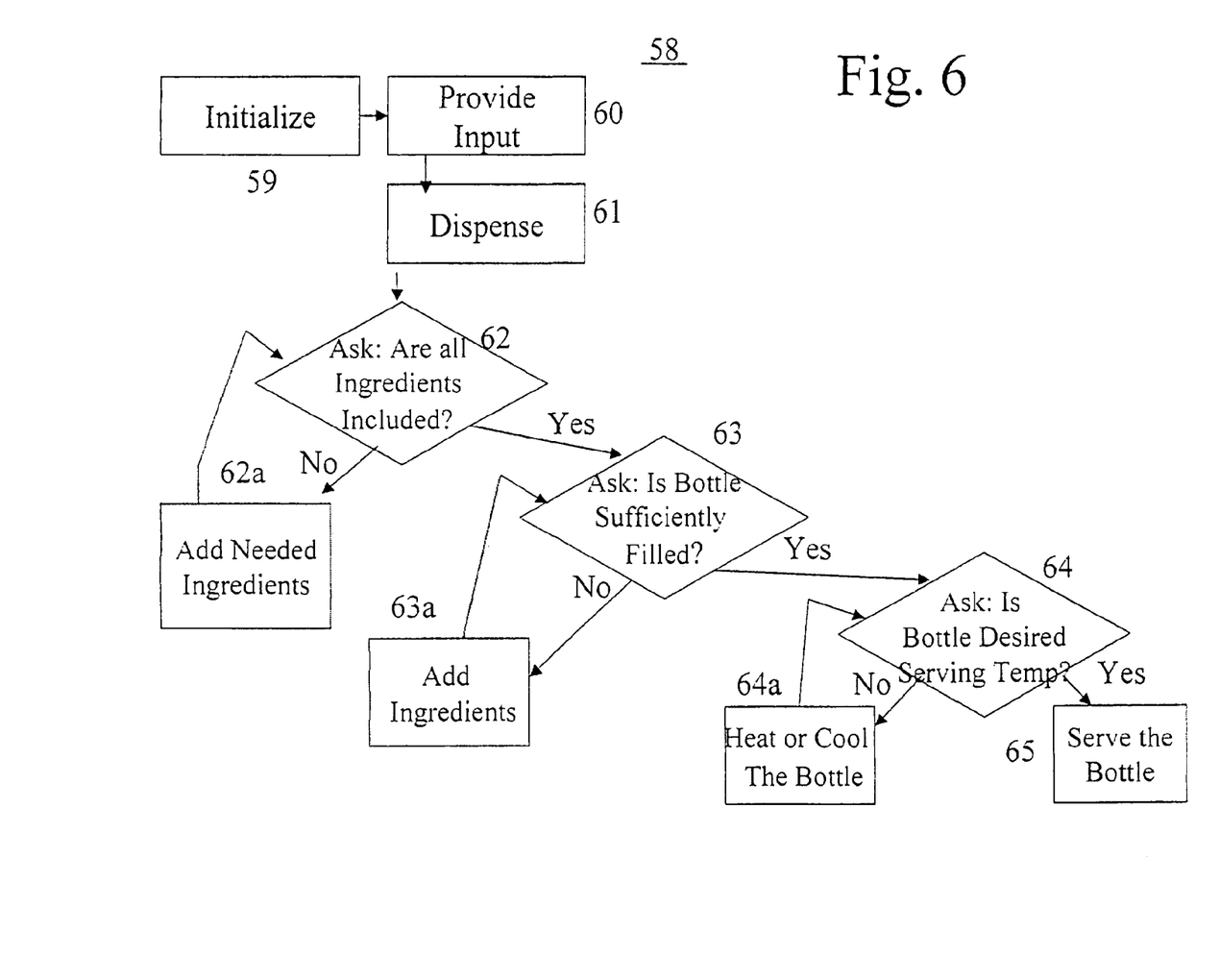
FIG. 6 is a flow chart illustrating a method of preparing a feeding formula in accordance with the present invention.

Reference is now made to FIG. 6 that illustrates a method of preparing a fluid food in accordance with the present invention, hereinafter referred to as method 58. It is understood that method 58 is carried out on device 10 previously described herein, and all of the parts, elements and devices that constitute device 10 are referred to hereinafter by their functional designation, without their previous identifying reference number.

Method 58 begins by step 59, initializing device 10, which includes turning device 10 on by activating an on/off switch or button. This action supplies electricity to device 10 that then begins initiating its functional elements. The data processor measures the quantities of water in each water reservoir and the quantities of ingredients in each container. If the quantities are adequate, it activates the heaters in each water reservoir. If quantities are not adequate, an appropriate alert is provided via the user interface and/or is sent via a communications network to an appropriate user client, prompting the user to replenish all needed quantities. Once all quantities are adequate and the water has been brought to operating temperatures, it can be said that initialization 59 has concluded.

Method 58 then comprises step 60 of providing user input. As described hereinbefore, there are a number of parameters of any fluid food to be prepared, including but not limited to the composition (specific type and nature of the ingredients), the proportions (quantities of each ingredient), the consumption temperature of the fluid food to be served and the quantity of fluid food required. It is the role of the user, either on site via the user interface or remotely via a communications network, to provide the necessary input to instruct the device of the fluid food to be prepared. If the user input provided indicates a need for an ingredient not present within the device, an appropriate alert will be provided, prompting the user to add the ingredient.

After all needed informational input is provided and all ingredients are present in appropriate quantities, the device commences step 61, which is to dispense the desired quantity of water from the first reservoir, the desired quantity of water from the second reservoir, formula and any other ingredients needed from their respective containers into a receiving vessel, such as a baby bottle. Such dispensing, including the requirement of a calculation of the temperatures of the water, which is necessary to result in the fluid food being prepared at the desired consumption temperature, has been described hereinbefore.

Thereafter, method 58 preferably includes a number of evaluation steps, including:

Step 62—Determining whether all needed ingredients have been dispensed. The data processor compares the programmed list of ingredients to the actually dispensed ingredients and makes the determination. If all of the ingredients have not been dispensed, step 62a comprises adding the needed ingredients in order to comply with the programmed instructions. If all of the ingredients have been dispensed, a further evaluation takes place.

Step 63—Determining whether the bottle is sufficiently filled. The data processor compares the quantity requested with the quantity provided. The quantity provided is preferably determined by weighing the filled bottle and comparing the weight with programmed data indicating appropriate weight. If the weight is too low, step 63a comprises adding the correct quantity of needed ingredients in order to comply with the programmed instructions. If the weight is too great, indicating that the bottle has been filled more than instructed, an alarm message will appear on the user interface indicating so to the user. When the weight is correct, a further evaluation takes place.

Step 64—Determining whether the prepared fluid food is of the correct temperature. The data processor compares the programmed temperature to the actual current temperature and makes the determination. If the temperature is not correct, step 64a comprises adding water of a higher temperature or water of a lower temperature to respectively heat or cool the formula in order to comply with the programmed instructions. It is understood that adding water will change the concentration of the fluid food. Therefore, an alternative method of heating and cooling is provided. The bottle may be heated by subjecting it to heat produced by the secondary heater described hereinabove, or may be cooled by removing it from the device and bathing with cold water from a tap for a few seconds. When the fluid food is of the desired consumption temperature, the final step may be taken, to the baby's great relief.

Step 65—Serve the bottle to the hungry baby.

As can be understood from the relatively short number of steps comprising method 58, the work of preparing a fluid food according to the present invention is largely carried out by an automated device. The advantages of such a method and device are quite substantial, and include the following:

1. The caregiver is relieved of remembering and making the precise fluid food at every feeding. Once the device is programmed, the food is prepared automatically.

2. There is an immediate response. The food is prepared on demand at the desired consumption temperature. The baby need not wait for the correct temperature to be achieved.

3. A precise and error free preparation takes place every time.

4. The food prepared is hygienic. The water and consequently the food prepared therewith is sterile due to periodic reboiling. Similarly, purified or demineralized can easily and economically be used.

5. Dispensing water of the correct temperature does not impair the quality of the food by exposing it to too high a temperature.

6. Foods prepared may be personalized for individual consumers, and such personalized foods may be easily prepared. Conceivably, genetically specified formula can be supplied and easily used.

7. An individual baby's food may be customized or varied easily by the pressing of a few buttons. In this way, additives such as food supplements, medicaments, flavorings, and the like may be added on an as-needed basis.

8. Food, medicament and calorie consumption is accurately tracked. After a portion of liquid food is prepared and consumed, the food remaining is accurately measured.

9. Medicament administration may be tracked. The data processor may retain a record of medicaments added to the fluid food of any baby, which can be provided to a user.

10. Medicament administration may be compensated. When a food includes a medicament, any unconsumed food may be taken into consideration in preparing the subsequent feeding, in order to assure compliance with a prescribed medicament regimen.

11. Maintenance and cleaning is reduced. A device of the present invention is preferably configured to protect formula and other ingredients used herewith from both ambient humidity, contact with the atmosphere and from contact with water, for example with the use of formula-containing disposable cassettes;

12. A user may remotely provide input via a communications network.

13. Similar to No. 12, a user may receive information relating to the desired food composition from afar, thereby to monitor and oversee the feeding of a baby.

14. Introduction of new formulae containing innovative ingredients is eased as formula manufacturers do not need to redesign existing manufacturing and marketing approaches. Rather such ingredients can be directly offered to those who need or want them. New ingredients can be immediately introduced.

15. It is known that smaller infants (premature, twins, triplets) need to consume smaller portions of food at shorter intervals, generally need special formulae, medicine or additives, and are more finicky with respect to food. The present invention allows such infants to be easily fed.

14. Formula is stored in a sealed/protective container so is better preserved over time and does not degrade.

There are many applications for the present invention. The first and most obvious is private home use. Parents will be substantially relieved by using the present device and method to feed their baby, particularly in the middle of the night. For traveling parents, a portable version of a home use device may be smaller and configured to fit into an automobile and to work on 12V DC current. Institutions that care for multiple babies will find the device to be a great labor saving device. Such a device must be large enough and have the requisite capacity to prepare the quantity and the variations required. The device may be configured for geriatric feeding, simply by revising ingredients and therefore may prove useful in senior citizen homes or geriatric care facilities. The device and method may be used in hospitals and institutions for providing specific liquid diets for those unable to ingest or digest solid foods. Enteral feeding formulas may also be prepared. It is not difficult to imagine that such a device, dispensing a generic or popular feeding formula, could be made available in public places for the use of the public who may have a need, such as at airports, shopping centers and the like. Such devices could be configured as vending machines.

It is appreciated that certain features of the invention, which are, for clarity, described in the context of separate embodiments, may also be provided in combination in a single embodiment. Conversely, various features of the invention that are, for brevity, described in the context of a single embodiment, may also be provided separately or in any suitable subcombination.

Although the present invention has been described in the context of the feeding of human infants, it is clear that the teachings of the present invention are applicable also to the feeding of adults, especially ill and the very old, and to the feeding of non-human animals, in a veterinary, agricultural or animal-care context.

Although the examples hereinabove have depicted a device of the present invention with only one formula container, in some embodiments a device of the present invention includes two or more formula containers, preferably each formula container containing a different formula. In such an embodiment, the associated control system is configured to dispense an appropriate amount of formula from each one of the two or more containers.

It will be appreciated by persons skilled in the art that the present invention is not limited to what has been particularly shown and described hereinabove. Rather, the scope of the present invention is defined by the appended claims and includes both combinations and subcombinations of the various features described hereinabove as well as variations and modifications thereof which would occur to persons skilled in the art upon reading the foregoing description. Accordingly, it is intended to embrace all such alternatives, modifications and variations that fall within the spirit and broad scope of the claims.

What is claimed is:

1. A device for preparing a fluid food with a desired consumption temperature on demand, the device comprising:
   (a) a first water reservoir which comprises a first controllable water outlet, a first heater operable to heat water in said first reservoir and a first thermal sensor operable to report temperature of water contained in said first reservoir;

(b) a second water reservoir which comprises a second controllable water outlet, a second heater operable to heat water in said second reservoir and a second thermal sensor operable to report temperature of water contained in said second reservoir;

(c) a first container for holding a formula, said first container having a first controllable dispenser for dispensing said formula;

(d) a data-processor/controller operable to receive water temperature data from said first and second thermal sensors, further operable to calculate a quantity of water from each of said first and second reservoirs needed to mix with a quantity of said formula in order to prepare said fluid food at said desired consumption temperature, and further operable to control operation of said first and second controllable water outlets so as to dispense said calculated quantities of water for mixing with said quantity of formula, said data-processor/controller being further designed and configured to command alternating periodic heating of water in said first and second reservoirs to sterilization temperatures, said periodic heating being so controlled that at first times said first reservoir contains water at a temperature above said desired consumption temperature and said second reservoir contains water below said desired consumption temperature, and at second times said first reservoir contains water at a temperature below said desired consumption temperature and said second reservoir contains water above said desired consumption temperature, thereby enabling periodic sterilization by boiling of water in both said first and said second reservoirs, and also enabling said production of food at said desired consumption temperature by mixing of said formula with selected amounts of water from said first and second reservoirs.

2. The device of claim 1, wherein said data-processor/controller comprises a data processor and controller integrated on a single electronic chip.

3. The device of claim 1, wherein said data-processor/controller is programmed to boil water for a period of at least about 20 seconds during said periodic re-heating of water in said first and second reservoirs.

4. The device of claim 1, wherein least one of said first and second reservoirs is sealed such that steam produced by boiling water therein remains captured and reliquifiable upon condensation when cooled.

5. The device of claim 1, wherein said data-processor/controller is designed to periodically reboil water in said first reservoir at predetermined intervals.

6. The device of claim 5, wherein said data-processor/controller is designed to boil water about every 1–5 hours.

7. The device of claim 5, wherein said data-processor/controller is designed to boil water about every 2–4 hours.

8. The device of claim 5, wherein said data-processor/controller is designed to boil water about every 3 hours.

9. The device of claim 1, wherein said desired consumption temperature is about 25 to about 35 degrees centigrade, said data processor and said controller being designed and configured for determining said quantity of water from each of said first and second reservoirs needed to mix with said quantity of said formula in order to produce said fluid food at a consumption temperature of between 25 and 35 degrees centigrade.

10. The device of claim 1, further comprising a second container for holding at least one additional ingredient, said second container having a second controllable dispenser for optionally dispensing a quantity of said additional ingredient.

11. The device of claim 10, wherein said additional container is designed to dispense one of a group consisting of a food supplement, a medicament, and a flavoring.

12. The device of claim 1, wherein said data-processor/controller is operably coupled with a user interface, said user interface being for displaying information related to said fluid food and for accepting input related to said fluid food, such that said data-processor/controller controls dispensing of said quantities of water and said quantity of formula according to said input.

13. The device of claim 1, designed and constructed to be operable to dispense water from said first and second reservoirs and formula from said first container into a recipient suitable for feeding an infant.

14. The device of claim 1, designed and constructed to be operable to dispense water from said first and second reservoirs and formula from said first container into a recipient suitable for feeding an adult in need of liquid feeding.

15. The device of claim 1, wherein said container and said first controllable dispenser for dispensing said formula are designed and constructed so as to substantially avoid dispensing any of said formula such tat said first and second controllable water outlets will become contaminated with remnants of said formula.

16. The device of claim 1, wherein said first container is designed and constructed for recharging with said formula when depleted.

17. The device of claim 7, wherein said container is prepackaged with said formula and is disposable when depleted.

18. The device of claim 1, wherein said container is designed and constructed to operably accept therein a prepackaged refill containing said formula.

19. The device of claim 1, wherein said data-processor/controller is operable to communicate information related to its operations via a communications network.

20. The device of claim 1, designed and constructed to be operable to dispense water from said first and second reservoirs and formula from said first container into a recipient suitable for enteral feeding.

21. The device of claim 11, further comprising a weight sensor operable to weigh a recipient for said fluid food before and after filling of said recipient.

22. The device of claim 1, wherein said data-processor/controller is further operable to calculate and to record amounts of food consumed by subtracting, from a recorded weight of a recipient containing freshly prepared food, a detected weight of said recipient subsequent to food consumption by a user.

23. The device of claim 1, wherein said data-processor/controller is operable to record and report times and amounts of food preparation.

* * * * *

UNITED STATES PATENT AND TRADEMARK OFFICE
CERTIFICATE OF CORRECTION

PATENT NO. : 7,104,184 B2
APPLICATION NO. : 10/755289
DATED : September 12, 2006
INVENTOR(S) : Eytan Biderman and Noam Ziv It is certified that error appears in the above-identified patent and that said Letters Patent is hereby corrected as shown below:

On the Title page, insert in the section marked

Item [75]   Inventors:

--Eytan Biderman, 73 Weizmann St., 62155 Tel-Aviv (IL)

Noam Ziv, 5 Barazani St., 62121 Tel Aviv (IL)--

Signed and Sealed this

Sixth Day of March, 2007

JON W. DUDAS
*Director of the United States Patent and Trademark Office*